United States Patent [19]

Gordon

[11] 4,196,087
[45] Apr. 1, 1980

[54] FLOATING, SURFACE LIQUIDS RETRIEVAL SYSTEM

[76] Inventor: Ellison T. Gordon, c/o Anderson, Toledano & Courtney, 225 N. Columbia St., P.O. Box 120, Covington, La. 70433

[21] Appl. No.: 905,383

[22] Filed: May 12, 1978

[51] Int. Cl.² .................................... E02B 15/04
[52] U.S. Cl. ................... 210/242 S; 210/DIG. 25
[58] Field of Search ............... 210/83, 242, DIG. 25

[56] References Cited

U.S. PATENT DOCUMENTS

| | | | |
|---|---|---|---|
| 3,219,190 | 11/1965 | Thune | 210/242 S |
| 3,259,245 | 7/1966 | Earle | 210/DIG. 25 |
| 3,447,683 | 6/1969 | Luce, Jr. | 210/83 |
| 3,536,199 | 10/1970 | Cornelius | 210/DIG. 25 |
| 3,659,713 | 5/1972 | Mueller | 210/242 S |
| 3,794,175 | 2/1974 | Stewart | 210/242 |
| 3,810,546 | 5/1974 | Oxenham | 210/242 |
| 3,838,775 | 10/1974 | Larsson | 210/242 |
| 3,847,815 | 11/1974 | Bagnis | 210/242 S |
| 4,031,707 | 6/1977 | Russ | 210/242 |
| 4,119,541 | 10/1978 | Malteya | 210/242 |
| 4,151,081 | 4/1979 | Bolli | 210/242 S |

*Primary Examiner*—Theodore A. Granger
*Attorney, Agent, or Firm*—C. Emmett Pugh & Associates

[57] ABSTRACT

A floating retriever for retrieving, for example, spilled oil or other liquid substances on the top of water having a central liquid collection chamber with a vacuum or suction pick-up for delivery of the pollutants to a mother vessel which controls the retriever by means of a boom structure. The retriever has a large surrounding circular float with intake ports with "V" shaped lateral screws to bring the retrieved liquid to the collection chamber. The device includes an inverted-dome, water well with limited openings underneath the collection chamber for stability, as well as radially positioned, selectively controlled, out-rigger screws including an auxiliary tow, for drawing the oil to the intake ports and providing for propulsion and guidance. The ports have inclined stepped bottom surfaces with discharge holes with a lower paddle wheel drive to initially enhance oil/water separation, as well as air jets or sprays for producing a suction effect in the intakes.

12 Claims, 13 Drawing Figures

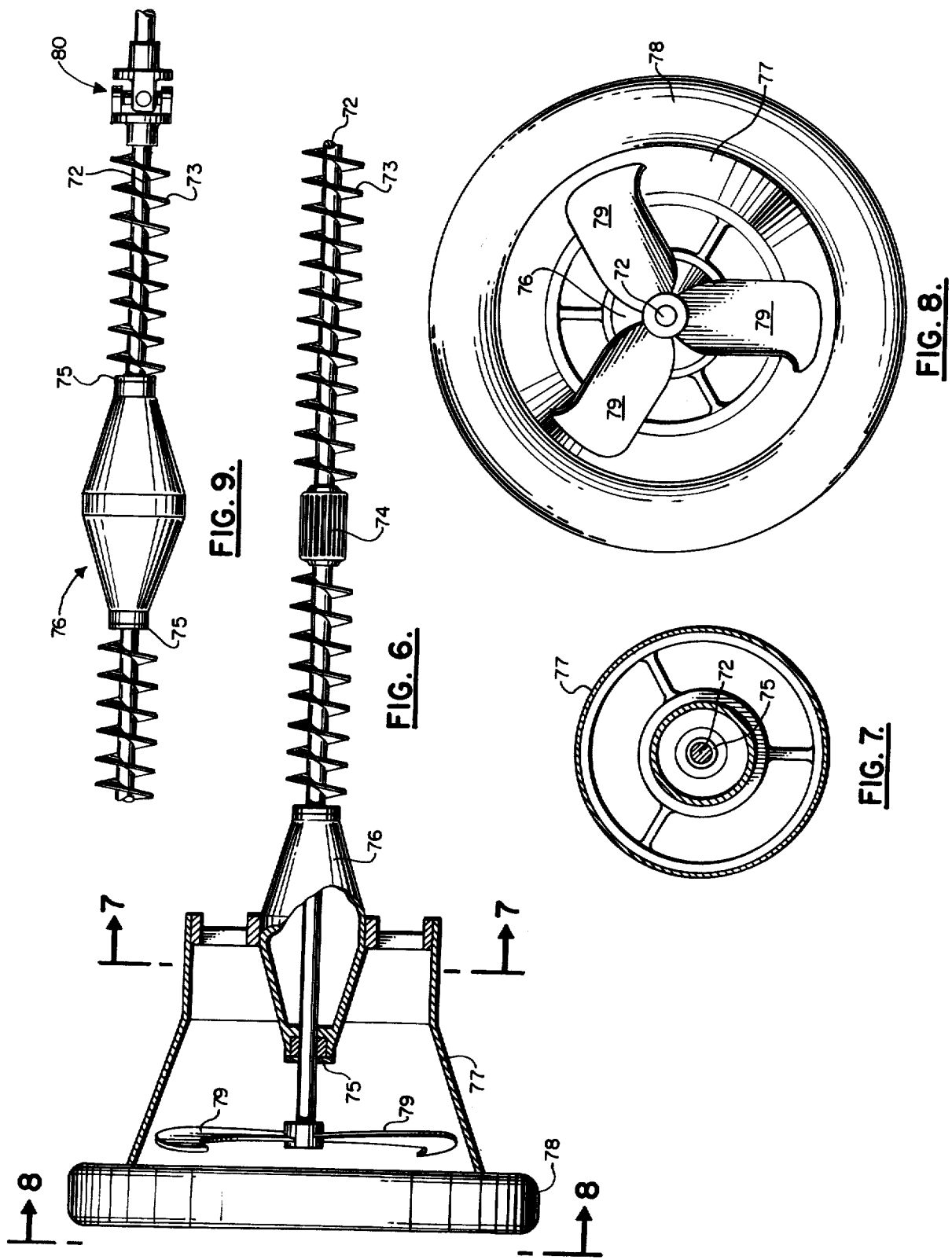

FLOATING, SURFACE LIQUIDS RETRIEVAL SYSTEM

BACKGROUND OF THE INVENTION

1. Field of the Invention

This invention relates to a system having method and structural aspects for collecting liquids, such as for example, spilled oil, from the surface of bodies of water.

2. Prior Art

Various types of retriever devices have been employed in the past to separate and collect pollutants from the surface of water. Such apparati have, in general, been unable to perform efficiently in wave conditions due to inherent design flaws and a lack of stability in open waters. These devices are unable to collect the surface liquid in an efficient concentrated form, often gathering large amounts of water at the same time. In addition, the prior art, as a whole, does not operate over a great enough area to practically handle very large oil and chemical spills.

GENERAL DISCUSSION OF INVENTION

The present invention overcomes the aforementioned difficulties in the collection of liquid surface pollutants in fresh or salt water.

In the preferred embodiment a central liquid collecting chamber is surrounded by a large circular float with triangular shaped intake ports in the float to allow the retrieved liquid to reach the collecting chamber. This design allows for most of the weight of the apparatus and added ballast to be centrally located, increasing stability.

The retriever itself can be built in any size from several feet to fifty feet or greater in diameter. A large retriever would be more stable in ocean use and would also be able to handle large chemical spills efficiently.

An inverted-domed water well is included in the retriever underneath the collecting chamber to add stability in wave conditions. Radially disposed screw drives mounted on shafts pull the oil in some distance from large surrounding areas towards the retriever. These buoyant screw drives also function as outriggers to add further stability in wave conditions. If desired, these screw drives can be operated independently of each other and their rotational speed varied by the shipboard operator. Increasing the turning revolutions of a screw drive would increase the flow rate of the surface liquid into the skimmer and also, by selectively varying the various screw-drives, provide the retriever with motive power.

Shaped screws at the intake ports of the retriever are angled to force the surface liquid towards the center of the ports and up the inclined bottoms of the ports. Each inclined bottom has several holes in its stepped surface to allow water to drain off of the surface. The stepped surface keeps most of heavier liquid, water, from entering the central collecting chamber.

The surface liquid is then drawn from the collecting chamber into a storage tank mounted on the mother vessel by use of a vacuum line. The vacuum line is mounted at a set level at least near the top of the collecting chamber so as to only remove the surface liquid in the chamber. This dual system of separation involving the inclined, stepped bottom and the vacuum line is very effective in recovering a high concentration of surface liquid even under abnormal wave conditions.

Additionally, the draw of the intake ports is enhanced by the inclusion of air jets which creates a suction into the central collecting chamber.

Further inherent advantages of and improvements achieved by the present invention will become more readily apparent upon consideration of the following, more detailed description and by reference to the appended drawings.

BRIEF DESCRIPTION OF THE DRAWINGS

For a further understanding of the nature and objects of the present invention, reference should be made to the following detailed description, taking in conjunction with the accompanying drawings, in which like parts are given like reference numerals and wherein:

FIG. 6 is a plan view of the auxiliary tow with the rotating blade housing broken away.

FIG. 7 is a vertical cross-sectional view of the auxiliary tow's buoyant housing taken along section lines 7—7 of FIG. 6.

FIG. 8 is an end view taken along perspective lines 8—8 of FIG. 6 showing the rotating blades and housing of the auxiliary tow.

FIG. 9 is plan view of the shaft of the auxiliary tow.

FIG. 12 is a partial, side, close-up view of the vacuum pick-up system in the central collection chamber, while FIG. 13 is a perspective, close-up view of the vacuum pick-up needle of the vacuum pick-up system.

DETAILED DESCRIPTION OF THE PREFERRED EMBODIMENT

Figure 1:
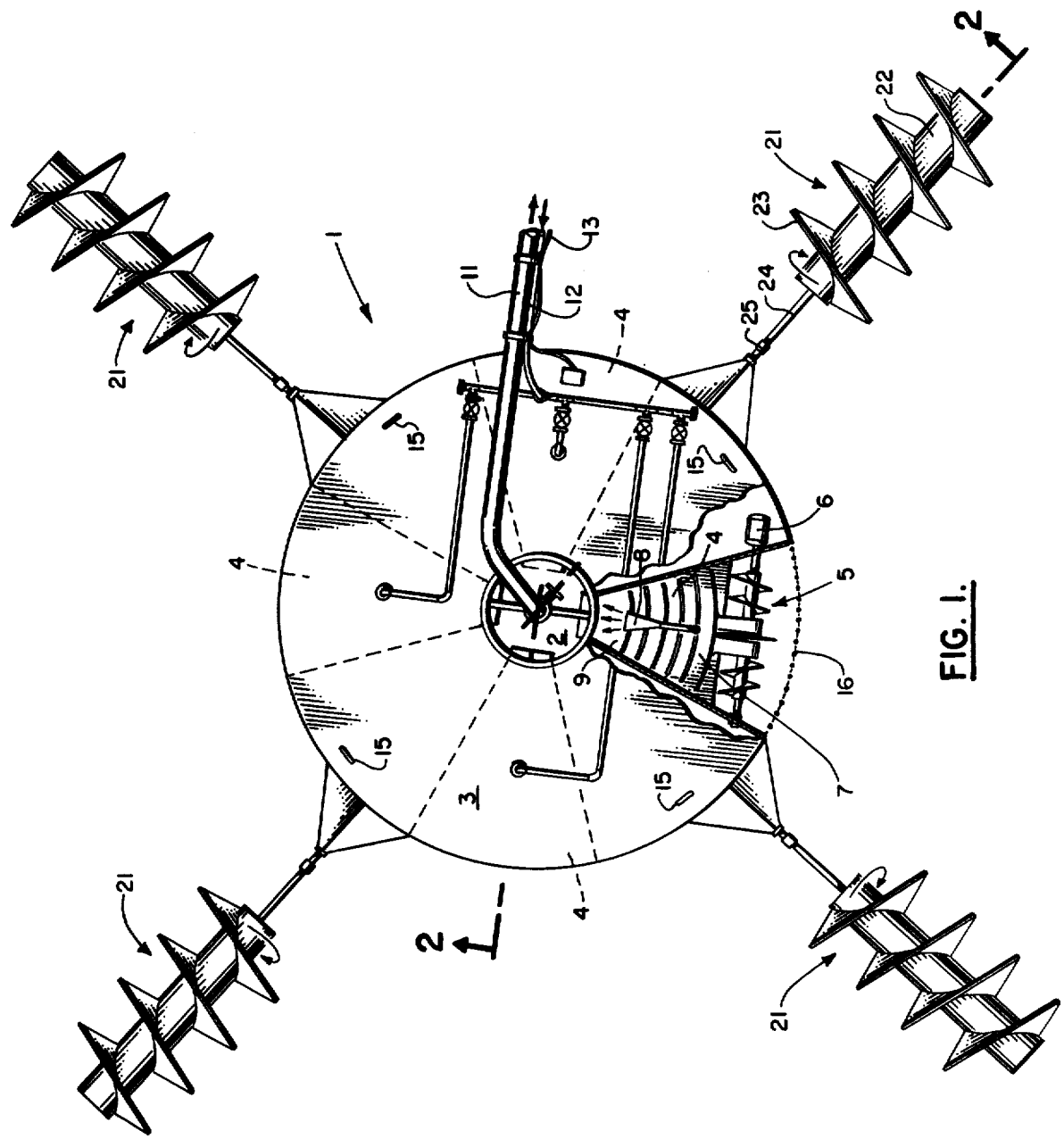
FIG. 1 is a plan view of the preferred embodiment of the apparatus of the present invention with a portion of the float broken away to disclose the details of an intake port.

Referring to the drawings, the preferred embodiment of the retriever 1 illustrated in FIG. 1 comprises a central liquid collecting chamber 2 surrounded by a circular float 3, the two forming the basic body of the retriever 1, which has a generally circular configuration in horizontal cross-section. Semi-triangular, equally spaced intake ports 4 are located in the float 3 to allow the oil or other surface liquid and debris (if desired) to reach the collecting chamber 2. Grates or screens 16 can be provided if desired at the intake ports 4 to keep out any unwanted debris. Screw drive assemblies 21 with screw vanes 23 mounted around buoyant cylinders 22 are radially and equidistantly disposed as outriggers around the retriever 1.

In this embodiment, four intake ports 4 are arranged radially about the retriever 1. The shaped "V" screw assembly 5 in each intake port 4 propels the surface liquids towards the middle of the port 4 and up the rising, inclined bottom 7 and then the liquid proceeds down the declined bottom section 9 (also note FIG. 2).

Compressed air lines 12 exhaust their contents through nozzles 8 in jet form to aid the passage of the surface liquids to the central collecting chamber 2.

Figure 2:
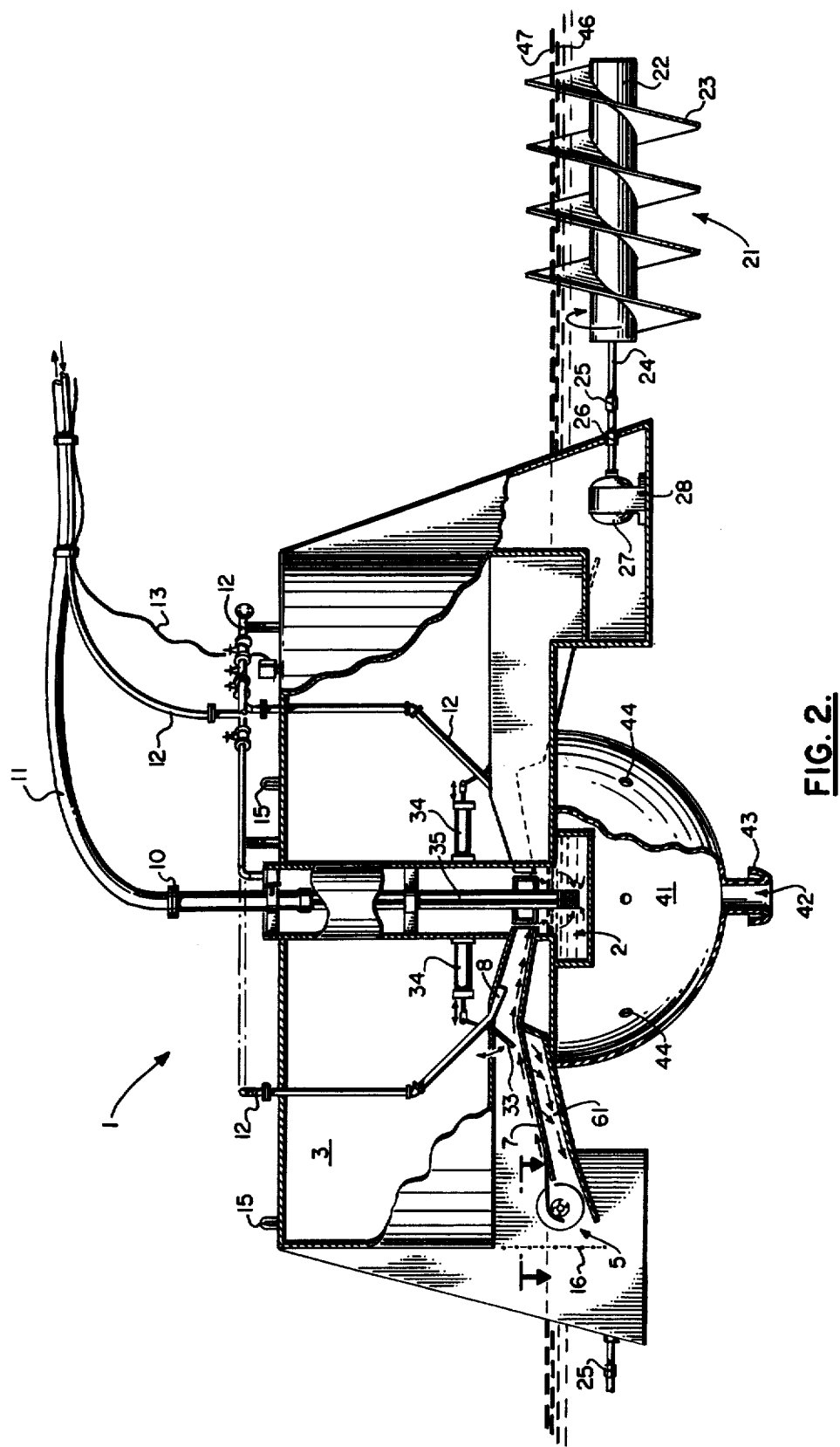
FIG. 2 is a vertical, sectional view of the embodiment of FIG. 1 taken along section lines 2—2 of FIG. 1.

With reference to FIG. 2, a vacuum line 11 enters the top of the collecting chamber 2 through a water tight connector 10 which is attached to a vacuum needle 35. The needle 35 is positioned at or at least near the top of the liquid surface in the collecting chamber 2 in order to draw off the surface liquids. The vacuum line 11, the air hoses 12 and the electric control lines 13 are run in a bundle from the retriever 1 to the "mother" vessel 86 (see FIG. 11).

A check valve 34 is used to control the access of surface liquids to the collecting chamber 2 by controlling the opening and closing of flap 33 in the ports 4. Lift pad eyes 15, for lifting and controlling the retriever 1, are built into the top of the apparatus 1.

An inverted-domed water well 41 is located at the bottom of the retriever 1 below the water line as best shown in FIG. 2. An opening 42 (exemplary diameter of two inches) which forms a circular cul-de-sac with lip 43, along with auxiliary openings 44, allow for the limited passage of water in and out of the water well 41, but generally the well 41 holds the water within its interior area and stabilizes the movements of the retriever 1. The water well 41 is thus very useful in providing additional stability to the retriever 1.

Figure 3:
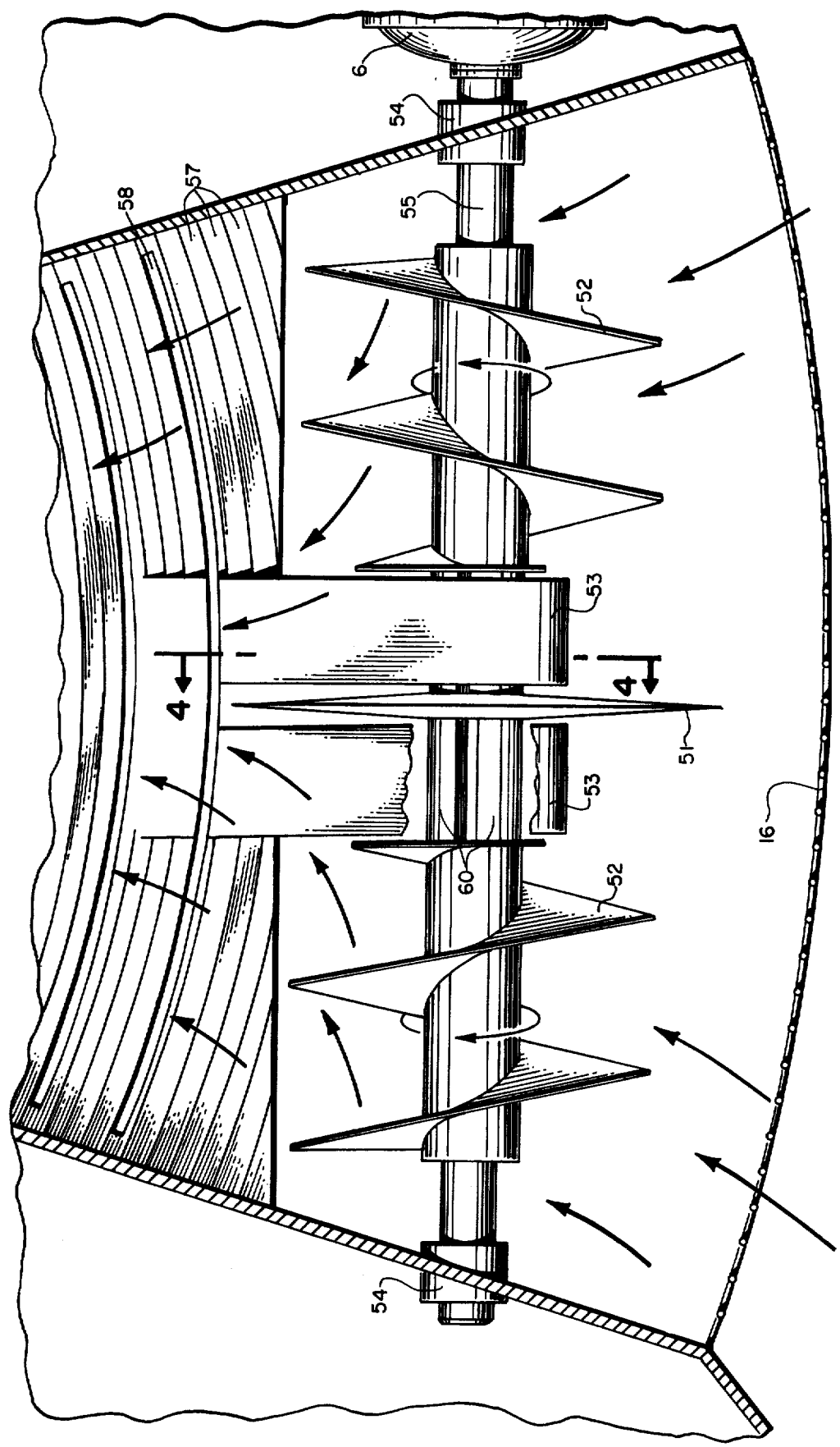
FIG. 3 is a partial, top view of an intake port taken along section lines 3—3 of FIG. 2.
Figure 4:
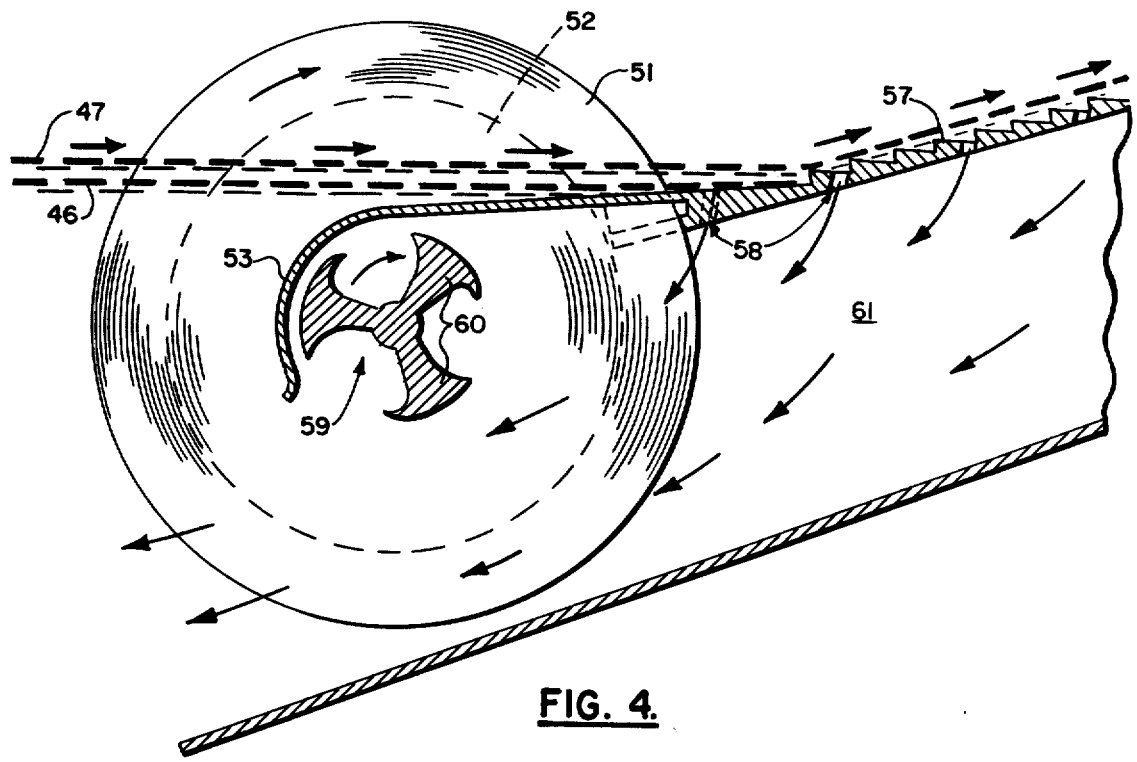
FIG. 4 is a partial vertical, cross-sectional view taken along section lines 4—4 of FIG. 3 illustrating the separation of liquids by the inclined surface.

As generally illustrated in FIG. 3 and FIG. 4, the shaped "V" screw assembly 5 draws the oil 47 and some water 46 into the intake port 4 (note directional arrows in FIG. 3). The vanes 52 of the "V" screw assembly are angled to force the surface liquid 47 towards the middle and the top of the stepped, inclined surface 7. A motor 6 turns the shaft 55 of the "V" screw assembly 5 through waterproof bearings 54. The motor 6 can be operated at varying revolutions to control the amount of the surface liquid on the inclined surface 7.

The shape of the vane structure of the "V" screw assembly 5 is important and should be distinguished from a general hexal or Archimedes type screw which would create an undesired emulsion between the oil and water. The vanes 52 are very steep and sharp making an angle with the shaft 55 of the order of eight degrees. Additionally, the vanes 52 do not go all the way to the center, but instead a straight, relatively thin and sharp, "V" shaped guide disc 51 is located there, preferrably separated a significant distance on both sides from the two separate sets of screw vanes 52.

The surface of the inclined bottom 7 is comprised of steps 57 to further aid in the separation of liquids. Holes 58 are placed in the lower most portion of at least some of the steps 57 on the surface of the bottom 7 to allow for water 46 to drain off. In the preferred embodiment, a geared wheel 59 with concave-type paddles 60, having a diameter substantially less than the diameter of the vanes 52 and the disc 51, aid the "V" screw assembly 5 in drawing the water down the water channel 61 and out of the retriever 1 (note directional arrows of FIG. 14). Fenders 53 are provided to isolate the upper (unseparated) and lower (initially separated) channels of liquid.

The dual system of separation provided by the inclined bottom 7 and the vacuum line 11 results in a high concentration of collected surface liquid. The resulting greater efficiency saves collection time and storage capacity. In addition, the collected surface liquids can be recycled easily with relatively little trouble.

Figure 5:
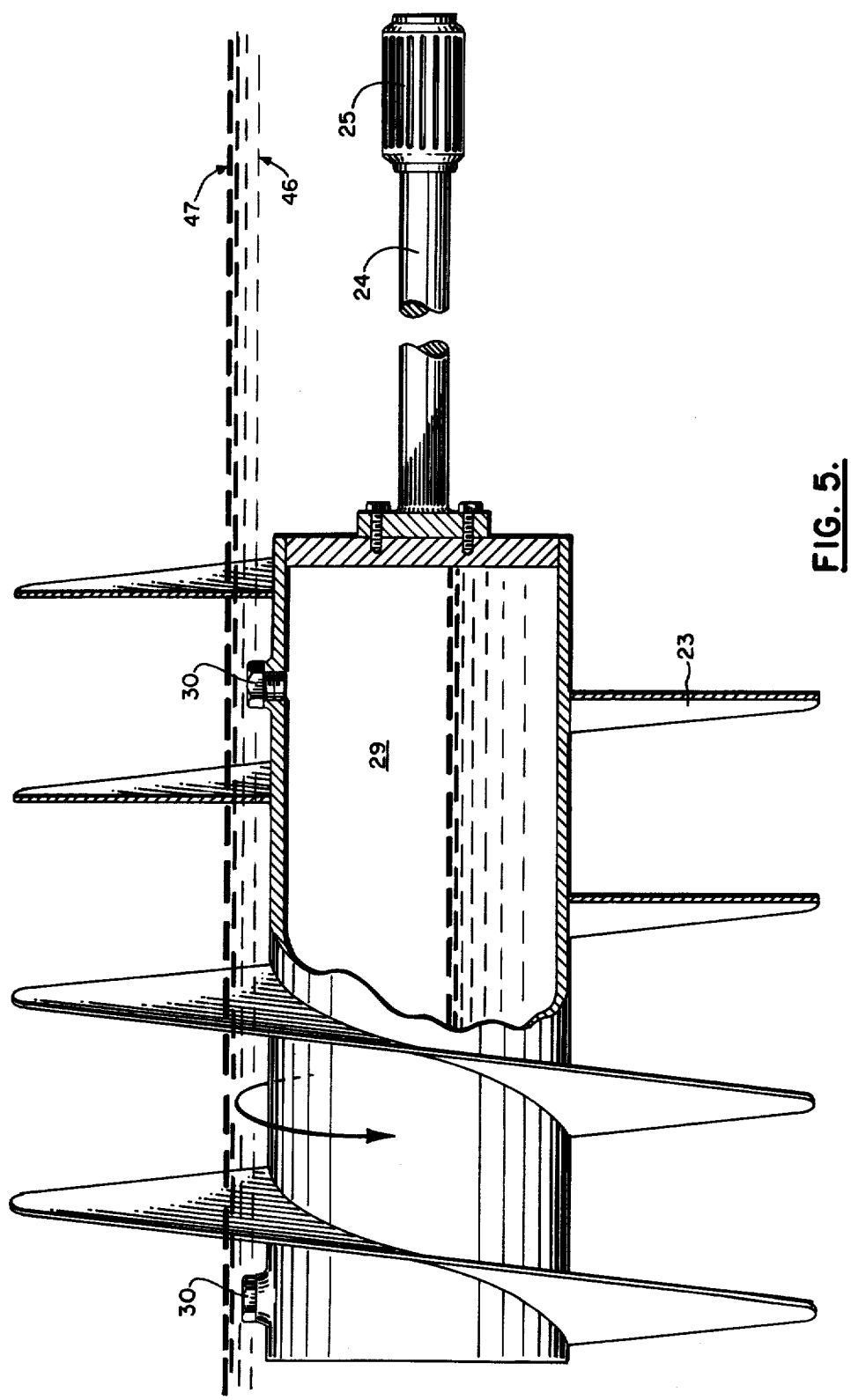
FIG. 5 is a partial, vertical, sectional view of one of the buoyant, radially disposed screw drives.

The buoyant screw drive assembly 21 featured in FIG. 2 and FIG. 5 is one of several screw assemblies 21 radially disposed around the retriever 1. The screw drive assembly 21 is mounted onto the body of the retriever 1 by use of a connection lock nut 25. A motor 27 placed on a motor mount 28 turns the shaft 24 of the assembly 21 through a waterproof bearing 26. To control the buoyancy of the assembly 21, as best illustrated in FIG. 5, the fluid chamber 29 is filled with the needed amount of fluid by use of fill caps 30 which can also be used to drain the chamber 29.

The vanes 23 are angled so that the assemblies 21 will gather surface liquids from over a large area (for example one hundred and fifty feet) and propel them towards the retriever 1. The screw assemblies can be designed to have sufficient pull to create their own current and move the surface liquids "against the grain", that is against the natural currents of the body of water. The ability to selectively use or separately vary the speed of the screw assemblies 21 on only one side of the retriever 1 provides a self-contained propulsion and guidance system. Thus, motive power is furnished by the assemblies 21 in addition to enhancing stability in rough seas.

It is possible of course to use just one such screw assembly 21 for propulsion and guidance, particularly if its angular position in the horizontal plane can be varied and controlled. Alternatively at least three are desired or four as illustrated spaced at ninety degrees to one another. Thus in the preferred embodiment of the present invention the screw assemblies 21 are separately and independenty controllable both in direction of rotation (clockwise or counter clockwise) and in the speed of rotation.

Besides propulsion and guidance, such controls also allow selective use of the intake ports 4. Thus, if there is oil to be retrieved on only one side of the retriever 1, the two back assemblies 21 can be used to push the retriever into the oil, while the front two assemblies 21 can be used to pull the oil into the intake port 4 between them with the flaps 33 being closed for the other three ports 4. If desired, the assemblies 21 could be mounted directly in line with the intake ports 4 rather than at the four "corners".

Figure 10:
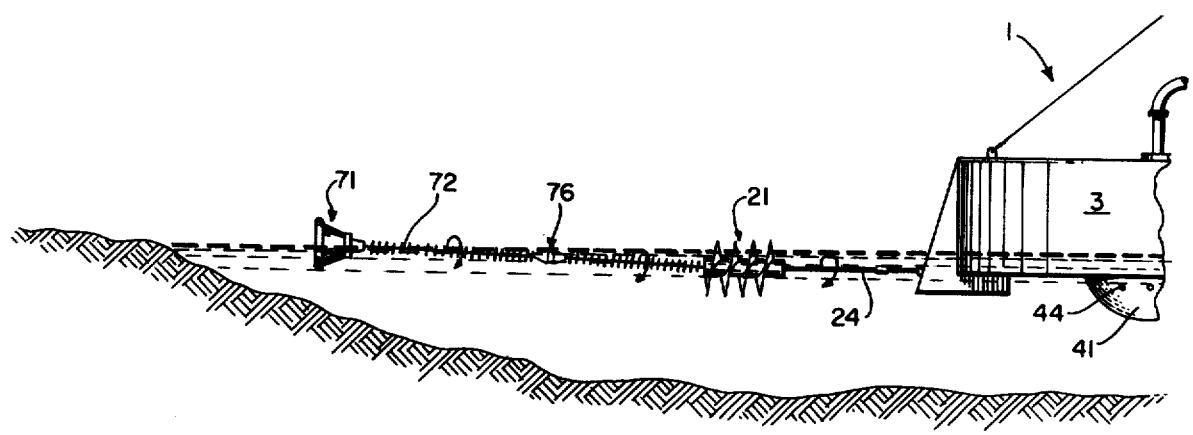
FIG. 10 is a generalized view illustrating the operation of the auxiliary tow.

An auxiliary tow 71, as shown in FIGS. 6-10, can be used to provide additional flexibility to the operation of the retriever 1. The two 71 is particularly useful in gathering surface liquids from shore lines and narrow coves. Functioning in much the same manner as the screw drive assemblies 21, the auxiliary tow 71 pulls surface liquids into the retriever 1. A shaft 72 of varying length is mounted onto the end of a screw drive assembly 21, as shown in FIG. 10, or in place of a screw assembly 21.

Buoyant rings 76 and buoyant collar 78 support the auxiliary tow 71 in the water. Waterproof bearings 75 are used in conjunction with the buoyant rings 76 and the tow housing 77. Surface liquids are drawn towards the retriever 1 by the operation of the rotating blades 79 and the vanes 73 of the tow shaft 72. To allow the length of the tow shaft 72 to be attached to the retriever 1 and to be varied for different uses, connecting lock nuts 74 are placed at the ends of the tow shafts 72. Universal joints 80 are provided at various places along the tow shafts 72 so that the auxilary tow 71 can be used in wave conditions.

Figure 11:
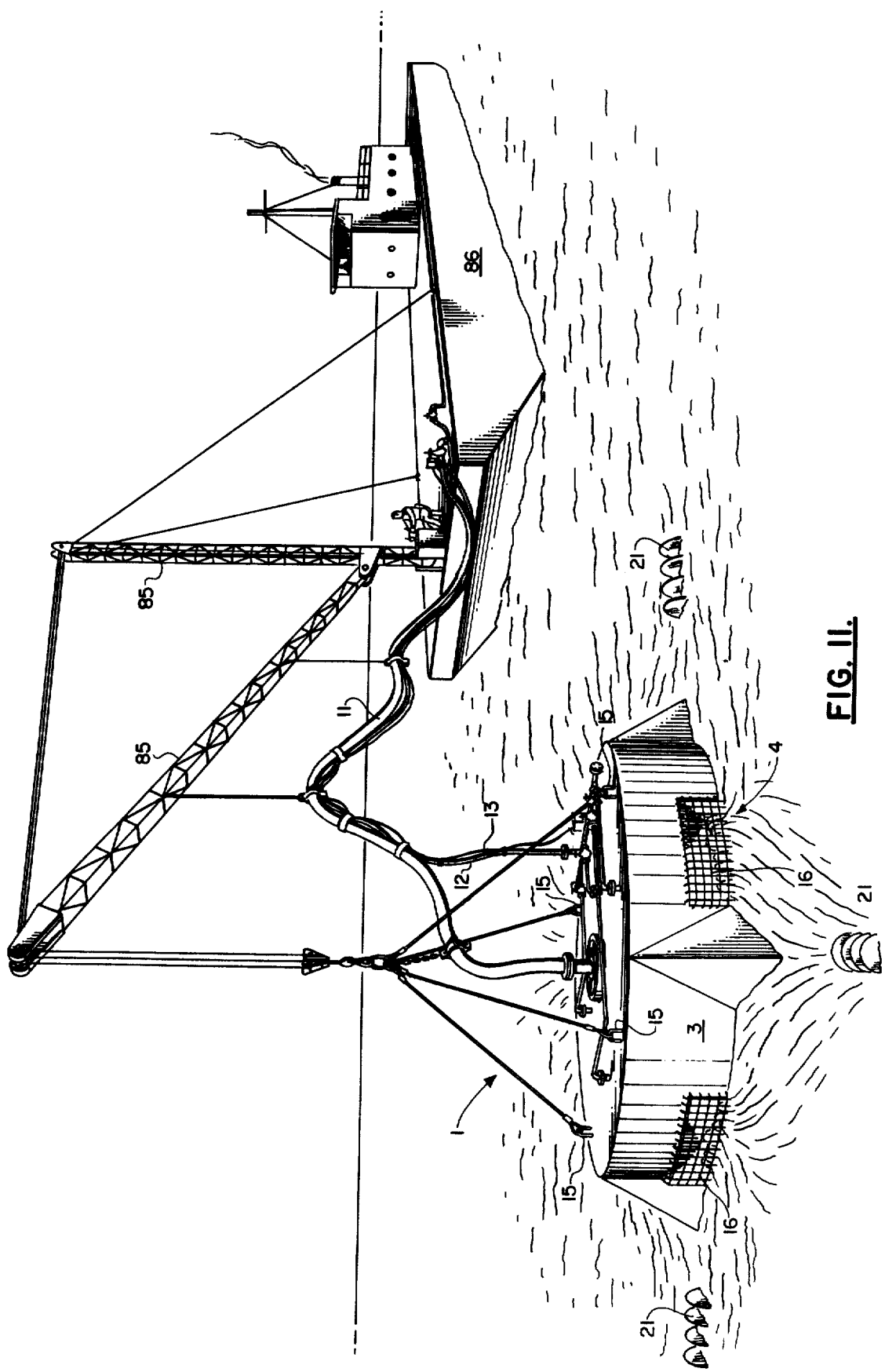
FIG. 11 is a perspective view of the retriever being controlled by a boom mounted on a mother vessel.

FIG. 11 illustrates the operation of the skimmer 1 by use of a boom 85 mounted on a mother vessel 86. With such an arrangement, one man can be relied upon to efficiently operate the retriever 1. An "umbilical cord" comprising the vaccuum line 11, the compressed air line 12, and the electrical control lines 13, also extends from the retriever 1 to the "mother" vessel 86.

Figures 12, 13:
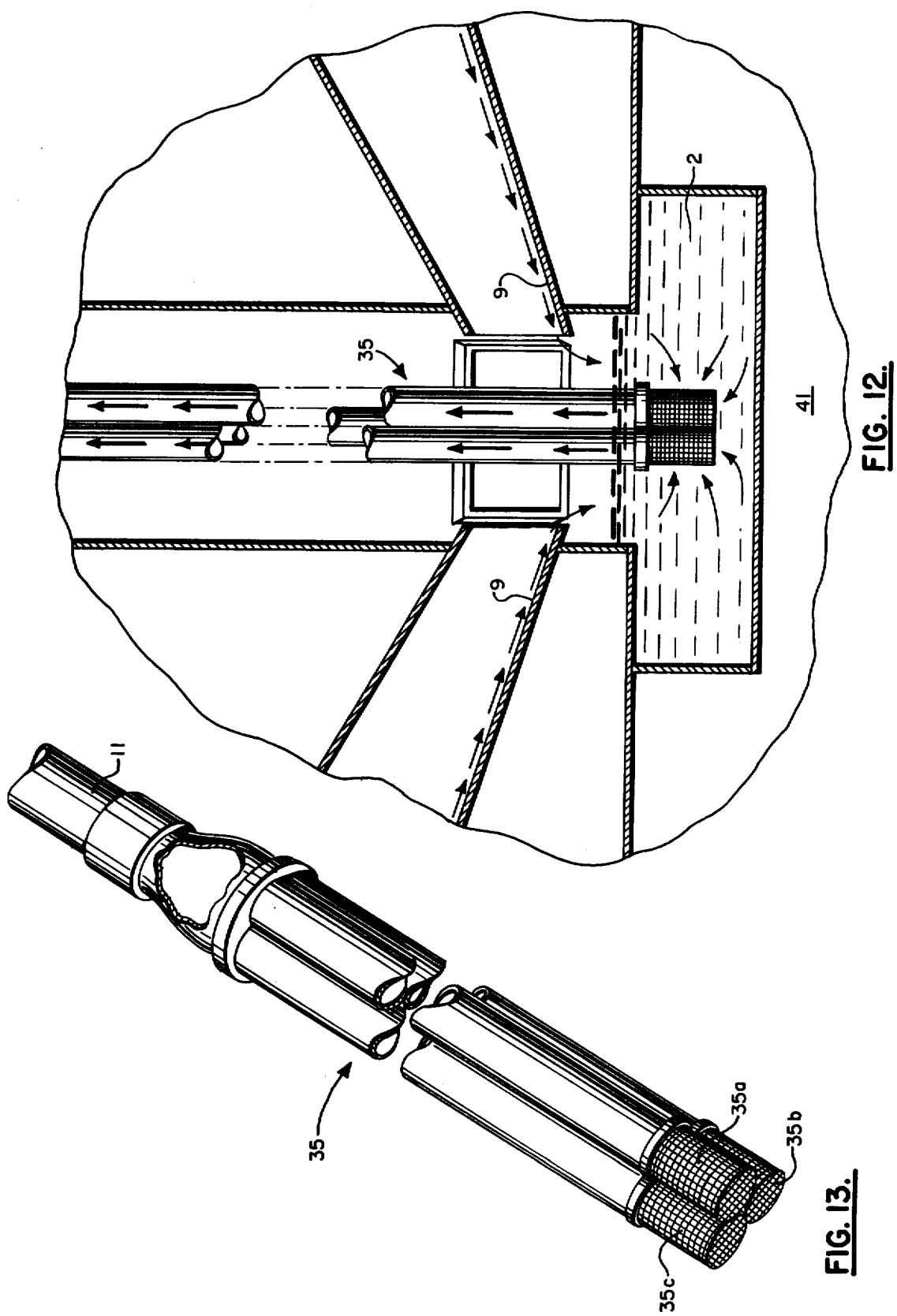

As shown in FIGS. 12 and 13, the vacuum pick-up needle 35 extends down into the liquid collecting chamber 2 which also serves as a reservoir having an exemplary capacity of twenty-five to thirty gallons. The vaccum needle 35 comprises an exemplary collection of three tubes 35a, 35b and 35c (each having an exemplary diameter of three inches) which commonly lead into the vacuum line 11 (having an exemplary diameter of six inches). It is estimated that such a pick-up system should be able to handle a capacity of fity to seventy-five gallons of oil per minute, or even greater.

Because many varying and different embodiments may be made within the scope of the inventive concept herein taught, and because many modifications may be made in the embodiment herein detailed in accordance with the descriptive requirements of the law, it is to be understood that the details herein are to be interpreted as illustrative and not in a limiting sense.

What is claimed as invention is:

1. A buoyant apparatus for collecing liquids floating on the surface of water, comprising:
   a. a basic body having an internal liquid collecting chamber having a flotation means associated therewith for providing flotation to said body;
   b. at least one intake port located adjacent to and in communication with said collecting chamber arranged to allow for the passage of the liquid to said collecting chamber;
   c. a floating device connected to said basic body for pulling the surface liquids at a distance inwardly to said intake port. comprising
      i. a motor associated with said device;
      ii. rotatable shaft means connected to said motor for being driven by said motor and extending at least generally horizontally out radially away from said base body:
      iii. buoyant means connected to said shaft for floating said screw device on the water; and
      iv. screw vane structure means circling the outside surface of said shaft means and protruding above the water line for contacting the surface liquids and driving them inwardly to said intake port when said shaft means is rotated;
   d. lateral, rotatable, driven means at said intake port for driving the liquid through said intake port, said driven means comprising a rotatable shaft located laterally across and at the entry of said intake port, said shaft carrying liquid driving vanes for rotation therewith; and
   e. liquid pick-up means in said collecting chamber including vacuum line for sucking up the liquids for pick-up and ultimate removal of the liquids from the water area.

2. The apparatus of claim 1 wherein there is further included compressed air jet means positioned in said intake port(s) and directed inwardly for creating a suction flow in said intake port(s) to enhance the liquid flow towards the collecting chamber.

3. The apparatus of claim 1, wherein said intake port(s) include inclined surface means having an inclined bottom rising toward said collecting chamber for producing initial separation between the surface liquid and water.

4. The apparatus of claim 3 wherein said inclined bottom surface is provided with discharge holes to aid separation of the liquids from the water.

5. The apparatus of claim 4 wherein a driven paddle wheel is mounted below said intake port(s) to aid the liquid flow to and from said intake port(s) through said holes.

6. The apparatus of claim 1 wherein there is further included a separate "mother" vessel with boom means connected to the apparatus of claim 1 for controlling and operating it.

7. The apparatus of claim 1, wherein there is included at least said intake ports positioned and spaced at least generally equally about the periphery of said basic body; and wherein there is included at least three of said floating screw devices likewise positioned and spaced at least generally equally about the periphery of said basic body, each having independently operable drive means for independently and controllably rotating said screw devices to propel and guide the direction of travel of said basic body across the water surface.

8. The apparatus of claim 1, further comprising -
an inverted-dome like structure located at the bottom of said basic body below its water line, said inverted-dome-like structure being provided with limited openings to the exterior for allowing only limited water flow between the water body and the water within said dome-like structure.

9. The apparatus of claim 8 wherein said limited opening includes a centrally located bottom opening with peripheral lips which curl up to form a circular cul-de-sac.

10. The apparatus of claim 8 wherein said openings include a series of holes spaced about the side periphery of said dome-like structure.

11. The apparatus of claim 1, wherein said driven means further includes two separate oppositely spiraled sets of "V" screw vanes located on opposite sides of the centrally located portion of said lateral shaft, and a centrally located guide disc located between said sets of opposite screw vanes.

12. The apparatus of claim 11 wherein there is further included on said shaft for rotation therewith a paddle wheel having a diameter substantially less than the diameter of said screw vanes and said guide disc, and fender separation means located above, around and in juxtaposition to the upper periphery of said paddle wheel and extending to the bottom surface of said intake port for isolating the liquid/water flow above the paddle wheel which is acted upon by the larger diameter vanes and disc from the water flow below the bottom of said intake port.

* * * * *